T. H. E. BOHLMANN.
PISTON RING.
APPLICATION FILED FEB. 16, 1921.
1,420,406.
Patented June 20, 1922.
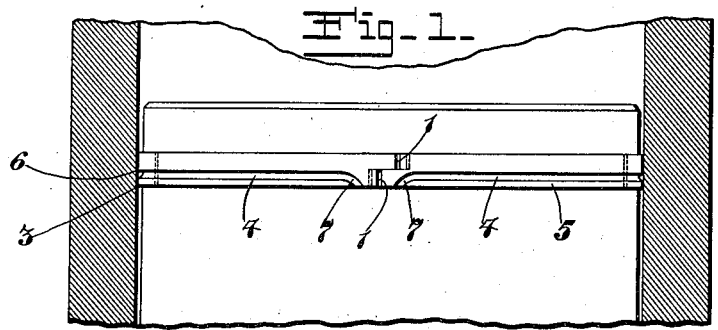
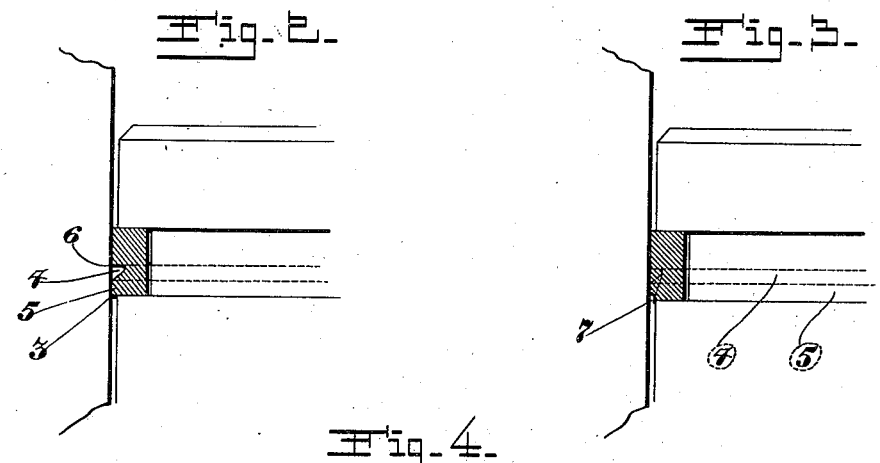
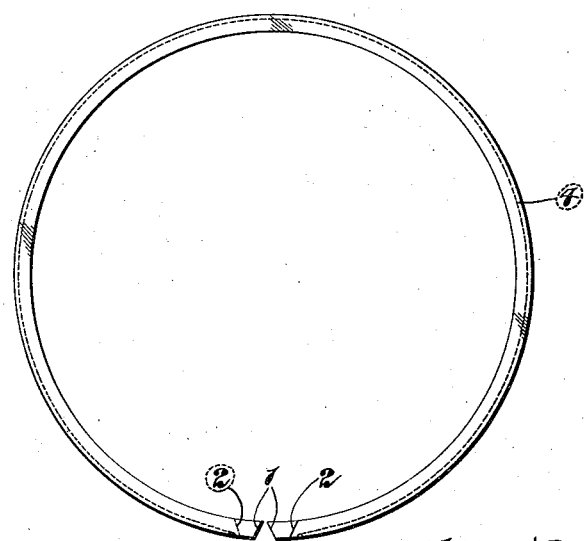
Inventor.
T. H. E. Bohlmann,
by Rippey & Kingsland,
His Attorneys.

UNITED STATES PATENT OFFICE.

THEODORE H. E. BOHLMANN, OF MAPLEWOOD, MISSOURI.

PISTON RING.

1,420,406.  Specification of Letters Patent.  Patented June 20, 1922.

Application filed February 16, 1921. Serial No. 445,451.

*To all whom it may concern:*

Be it known that I, THEODORE H. E. BOHLMANN, a citizen of the United States, and a resident of Maplewood, St. Louis County, and State of Missouri, have invented a new and useful Piston Ring, of which the following is a specification.

This invention relates to piston rings for internal combustion engines.

An object of the invention is to provide an improved piston ring having a circumferential oil groove which is bounded on one side by a wall terminating in a sharp corner at the periphery of the ring so that said sharp corner of the grooved wall will operate to scrape oil from the cylinder into the groove during movement of the piston; the said groove having its ends extended downwardly to the lower side edge of the ring whereby the oil from the ring will be discharged below the piston ring and between the piston and the cylinder wall.

Another object of the invention is to provide an improved piston ring having its lower side wall terminating in a sharp corner at the periphery of the ring and arranged to scrape oil from the cylinder wall during downward movement of the piston, said ring having a circumferential groove between the side edges thereof and terminating short of the ends of the ring with its ends extended downwardly to the lower edge of the ring to discharge oil between the piston and the cylinder, the upper side wall of the groove terminating in a sharp corner at the periphery of the ring so as to scrape oil from the cylinder wall into said groove during downward movement of the piston.

Another object of the invention is to provide an improved piston ring embodying a construction for obtaining a circumferential oil seal between the side edges of the ring and for discharging the oil from the seal between the piston and the cylinder wall outside of the groove in which the ring is mounted on the piston.

Another object of the invention is to provide an improved piston ring for obtaining the objects and advantages mentioned and embodying a novel step cut joint at its end.

Fig. 1 is a view showing my improved piston ring upon a piston.

Fig. 2 is a sectional view showing the formation of the oil seal groove and the scraping edges, one of which is at the lower side edge of the ring and the other of which is formed by the upper wall of the groove.

Fig. 3 is a sectional view showing the discharge end of the oil seal groove.

Fig. 4 is a view of the complete ring detached from the piston.

In the form shown my invention is embodied in a resilient imperforate split piston ring. The single ring, forming a complete packing, extends nearly the full width of the piston groove in which the ring is seated. The ends of the ring are provided with a step cut joint in which the extended ends overlap in sidewise relation, as shown in Fig. 1, when the ring is compressed within a cylinder. Each extended end is formed with a beveled extremity 1 which underlie beveled shoulders 2 when the ring is compressed, in order to hold the ends in proper relation.

The pistons of internal combustion engines, for which my ring is specially adapted, are essentially of less diameter than the bore of the cylinders in which they operate, leaving a slight space between the pistons and the cylinder walls. My improved piston ring is intended to close or seal the space between the piston and the cylinder wall in order to obtain more nearly perfect combustion. My improved ring by preventing the escape of gas between the piston and the cylinder wall obtains better compression, and also prevents oil from passing above the piston. These results are obtained in a more efficient and satisfactory way by use of a ring embodying the principles of the present invention, because the ring is constructed so that it will maintain an efficient seal by retaining sufficient oil around the ring to effect the seal. By the provision of one or more scraping edges the oil is scraped from the cylinder walls during the forward stroke of the piston and is thereby prevented from accumulating above the piston.

As shown, the lower wall of the ring forms a sharp edge 3 at the periphery of the ring which operates as a cutting edge to scrape oil from the cylinder walls during the forward stroke of the piston. An oil groove 4 is formed around the ring and is adapted to receive and to retain a quantity of oil to form a better seal. The lower wall of the groove 4 terminates at the periphery of the ring, somewhat above the sharp corner 3 leaving a circumferential portion 5 of the ring to press against the cylinder wall between the sharp edge 3 and the groove 4. The upper wall of the groove 4 terminates in a sharp corner 6 at the periphery of the ring, said corner operating as a cutting edge to scrape oil from the cylinder wall into the groove 4 during forward stroke of the piston, thereby preventing the oil from passing above the piston and also removing all material quantities of oil from the cylinder wall during forward movement of the piston. The groove 4 is wholly out of communication with the upper side of the ring due to the fact that said groove terminates short of the ends of the ring, so that the oil cannot pass from the groove 4 into the piston groove in which the ring is mounted, nor between the ends of the ring. This is desirable since if oil is permitted to accumulate within the piston groove or between the ends of the ring more oil will work above the piston than is possible if the oil is kept out of the piston groove and from between the ends of the ring. The lower wall of the groove 4 is preferably inclined toward the lower side edge of the ring which permits some of the oil from the groove to fill in spaces between the lower wall portion 5 of the ring and the cylinder wall and thus form a perfect seal when the piston is in position of compression. Thus any depressions or irregularities between the ring and the cylinder wall will be closed by the oil and a perfect seal will be formed. The oil will be scraped from the cylinder wall by the sharp edge 6 during forward movement of the piston.

Preferably the groove 4 is of considerable depth except the downwardly extended end portions 7 thereof. As shown in Fig. 2 the groove 4 is preferably of greater depth than the width of the space between the piston and the cylinder; whereas the discharge ends of the downwardly extended portions 7 of the grooves are preferably of less depth than the space between the piston and the cylinder wall, as shown in Fig. 3. This construction permits the oil to enter and fill the groove 4 while preventing the oil from the groove 4 from passing into the piston groove in which the ring is mounted. As shown, the bottom walls of the groove extensions 7, at the point where said grooves intersect the lower side walls of the ring, are arranged so that they will discharge the oil into the space between the piston and the cylinder. This constitutes an important feature of the invention since the oil is thereby prevented from passing from the groove 4 into the piston groove and by permitting the oil to accumulate within the groove 4 to serve as a perfect seal.

From the foregoing it will be seen that my invention completely serves all of its intended purposes by maintaining a perfect seal to prevent passage of gas between the piston and the cylinder; by preventing the oil from passing above the piston; by providing for the discharge of the oil from the groove 4 into the space below the piston ring outside of the piston groove; and by providing for the flow of oil into and out of the groove 4 so as to prevent hardening or carbonization of the oil therein, which might result from maintaining oil in a groove having no outlet for discharge of oil from the groove and replacement of fresh oil therein.

I claim:

1. In a piston ring, a resilient split ring provided with a circumferential oil groove terminating short of the ends of the ring, and having its ends adjacent to the ends of the ring extended obliquely downwardly toward each other to intersections with the lower side wall of the ring, said ends being of decreasing depth toward the lower wall of the ring.

2. A piston ring, comprising a resilient split packing provided with a circumferential oil groove terminating short of the ends of the ring, the ends of the groove adjacent to the ends of the ring being extended downwardly and intersecting the lower side wall of the ring, and the end portions of the groove being of less depth than the remaining portion of the groove, and of gradually decreasing depth toward the side edge of the ring.

3. A packing, comprising a resilient imperforate split ring provided with a circumferential oil groove terminating short of the ends of the ring, said groove being bounded on its forward side by walls sloping toward the forward side edge of the ring and intersecting the periphery of the ring above the forward side edge thereof and bounded on the opposite side by a wall terminating in a sharp corner at the periphery of the ring, operating as a cutting edge to scrape oil from the cylinder walls into the groove during forward stroke of the piston, and the ends of the groove being extended downwardly and inclined toward each other and being of decreasing depth to the lower side wall of the ring.

4. A packing, comprising a resilient imperforate split ring provided with a circumferential oil groove located wholly between the side edges of the ring and bounded on its forward side by a wall sloping toward the forward side edge of the ring and leaving a circumferential surface of the ring below the groove to operate against the cylinder, and said groove being bounded on its opposite side by a wall terminating in a sharp corner at the periphery of the ring operating as a cutting edge to scrape oil from the cylinder walls into the groove during the forward stroke of the piston, and the ends of said groove being extended downwardly and being of gradually decreasing depth to the lower side wall of the ring.

THEODORE H. E. BOHLMANN.